2,247,633

UNITED STATES PATENT OFFICE

2,247,633
FIREPROOFING PAINT

William K. Hearn, Seattle, Wash.

No Drawing. Application January 16, 1939,
Serial No. 251,233

2 Claims. (Cl. 134—44)

My present invention relates to the art of fireproofing treatment for fibrous material and, more particularly, to a fireproofing paint.

This invention relates to a paint, and method of treating materials to reduce their inflammability and, further, to the production of a paint which will resist high temperature without change in its structure or color.

There are many known fireproofing compounds each of which, however, has specific limitations as to its use. Many of the compounds are soluble in water and when exposed to atmospheric conditions, particularly rain and the like, are easily washed out of or off the materials treated. This is particularly objectionable where shingle roofs and the like are to be protected. Here they are subject to extremes of heat from the sun and to excessive moisture together with the penetrating action of wind driven rain. My paint, however, will withstand such conditions and give a marked degree of protection against inflammability.

In my present paint, and method of treatment, I make use of the proved, fireproofing characteristics of antimony compounds and provide, in the manufacture of my paint the chemical reaction that changes the simple chloride forms of antimony, such as butter of antimony, into the more stable oxychlorides. This compound is then combined with other elements which will give the desired color and will produce, in a water paint, the smooth texture so common to lead and oil paints, that is required if a smooth flowing paint is to be achieved. This is essential in order that an even coat of paint can be readily applied by any experienced painter. These and other objects are obtained from the paint made after my process.

It will be apparent that proportions used in compounding my paint may be varied to more fully meet definite requirements. For general use, however, as on shingles, siding of buildings, in the treatment of materials that are going to be subjected to excessive heat, I have found the following composition of materials to be very satisfactory.

To 5 gallons of cold, soft water, add
  5 ounces of butter of antimony (antimony chloride).

When this is apparently in solution, add

2½ lbs. of glue powder, such as casine or blood glue. When this has stood for approximately 15 minutes the mixture should be thoroughly stirred. Then add, in turn,
10 pounds of the desired mineral color, and
2½ pounds of diatomaceous earth. When this is thoroughly mixed, it is ready for immediate use; and will have a suitable consistency for proper application.

The mixing of the butter of antimony with the water is accompanied by a decomposition of the chlorides which are converted into the insoluble basic chloride and oxychlorides of antimony. Antimony chloride ($SbCl_3$) has desirable fire resistant qualities but it has been found subject to rapid hydrolization when subjected to normal atmospheric conditions, particularly moist air. Consequently, it has been found best to convert this into its more stable form of oxychloride ($SbOCl$). This compound, together with other products of the decomposition, such as the basic chlorides and more complex oxychlorides have been found to be insoluble in water and to cling tenaciously to any fibrous material, thus fully serving its intended purpose and, by virtue of these qualities can be expected to be ready to function satisfactorily long after the time of its application. When so broken down the solution of water and the antimony chloride would serve as an excellent dip for the immersion of fibrous materials, particularly shingles, and the like. However, the more general use of fireproofing materials requires that they be painted on the surface and it is to this end that I have added the additional elements which makes its application easily accomplished and which will support each other in maintaining the elements in their desirable form after long periods of exposure to the elements, or to heat far in excess of that which ordinary varnish, or oil and lead paint can withstand.

It has been found by trial that the ordinary cedar shingle painted with the composition as given above can successfully withstand temperatures of 575° F. for periods of hours without change or loss of color. Paint made according to the above formula if applied to metal will retain its original color and preservative qualities at temperatures up to 500° F.

A diatomaceous earth used in this formula is the white chalky material found in natural deposits and which is capable of very fine division and when so processed provides a very smooth filler for the paint which gives it a sufficiently smooth body so that under the painter's brush it will work in the same manner as a good lead and oil paint; thus making it possible to apply thin, even coats to surfaces to be treated.

Any suitable mineral color of the type normally used in the preparation of paint may be used in the above formula. The mineral colors may be used in different amounts to give different shades of the basic color, or a blending of color may be used to produce a distinct new shade.

It has been found that where relatively large quantities of the diatomaceous earth and the mineral color are used it is necessary to provide an adhesive binder for the same as neither the earth, nor the color, have adhesive properties. It has been found that the ordinary powdered casine glue when put into solution in the manner indicated will form a very tenacious binder which will cause the paint thus prepared to cling to either metal or wood or other surfaces and the cost of the same is relatively little. It has the other desirable characteristics of casine glue in that it is substantially waterproof and does not deteriorate with age. The so-called blood glue and no doubt others possess similar qualities.

Paint prepared after the indicated formula may be used to treat various material. It is suitable for use on virtually any of the common building materials. This includes, in addition to wood products, the fibrous building board, cloth, canvas, or paper wall covering, and the like. And when properly applied by any of the conventional means, such as dipping, spraying, or painting with a brush, the surface of the material is rendered relatively non-inflammable. The degree of inflammability of course varying with the amount of antimony butter employed and as the same is an expensive ingredient the amount used should be selected on the basis of the desired degree of inflammability or resistance to fire that it is desired to provide. The proportions given above however, will provide a quite satisfactory paint for normal use.

The foregoing description is believed to clearly disclose a preferred embodiment of my invention but it will be understood that this disclosure is merely illustrative and that such changes in the invention may be made as are fairly within the scope and spirit of the following claims.

Having thus fully described my invention what I claim as new and desire to secure by Letters Patent is:

1. A paint as described comprising 5 gallons of cold, soft water; 5 ounces of antimony chloride; 2½ pounds of glue powder; 10 pounds of mineral coloring, and 2½ pounds of diatomaceous earth.

2. The method of preparing a water color, fireproofing paint which consists in dissolving antimony chloride in cold water to hydrolize the same and to form the water insoluble, fire resistant oxychloride of antimony, adding a binder, and finally adding a filler.

WILLIAM K. HEARN.